US012592937B2

(12) United States Patent
Rosadini et al.

(10) Patent No.: US 12,592,937 B2
(45) Date of Patent: Mar. 31, 2026

(54) METHOD FOR PROTECTION FROM CYBER ATTACKS TO A VEHICLE, AND CORRESPONDING DEVICE

(71) Applicant: Marelli Europe S.p.A., Corbetta (IT)

(72) Inventors: Christian Rosadini, Corbetta (IT); Anastasia Cornelio, Corbetta (IT); Simona Chiarelli, Corbetta (IT); Walter Nesci, Corbetta (IT); Sergio Saponara, Pisa (IT); Emma De Pinto, Nocera Inferiore (IT)

(73) Assignee: Marelli Europe S.p.A., Corbetta (IT)

( * ) Notice: Subject to any disclaimer, the term of this patent is extended or adjusted under 35 U.S.C. 154(b) by 204 days.

(21) Appl. No.: 17/664,960

(22) Filed: May 25, 2022

(65) Prior Publication Data

US 2022/0394045 A1      Dec. 8, 2022

(30) Foreign Application Priority Data

May 26, 2021     (IT) ......................... 102021000013748

(51) Int. Cl.
  *H04L 9/40*          (2022.01)
  *H04L 12/40*         (2006.01)
(52) U.S. Cl.
  CPC ........ *H04L 63/14* (2013.01); *H04L 12/40045* (2013.01); *H04L 2012/40215* (2013.01); *H04L 2012/40273* (2013.01)
(58) Field of Classification Search
  CPC ............... H04L 63/14; H04L 12/40045; H04L 2012/40215; H04L 2012/40273
  See application file for complete search history.

(56) References Cited

U.S. PATENT DOCUMENTS

| | | | | |
|---|---|---|---|---|
| 2016/0003919 A1* | 1/2016 | Hirschbold | ............. | F02N 11/04 |
| | | | | 324/433 |
| 2018/0091550 A1* | 3/2018 | Cho | ...................... | H04L 5/0055 |

(Continued)

FOREIGN PATENT DOCUMENTS

| | | |
|---|---|---|
| CN | 111355714 A | 6/2020 |
| WO | 2018013171 A1 | 1/2018 |

OTHER PUBLICATIONS

Search Report for Italian Patent Application No. 202100013748 dated Jan. 28, 2022.

*Primary Examiner* — Alexander Lagor
*Assistant Examiner* — Rupali Dhakad
(74) *Attorney, Agent, or Firm* — Howard & Howard Attorneys PLLC

(57)          ABSTRACT

A method for protecting against cyber attacks in a communication network of a vehicle, including the steps of acquiring dominant voltage measurements; obtaining an electrical characteristic of nodes that transmit messages by acquiring consecutive groups of voltage measurements at receiving nodes and calculating a distribution thereof; calculating values of distribution statistics; calculating a cumulative voltage deviation for each value of statistic; and obtaining a voltage profile by adding the cumulative voltage deviations of each statistic, executing a malicious-node detection procedure and then executing a transmitting-node identification procedure including comparing the at least one characteristic parameter against all the corresponding characteristic parameters of all the messages, defining a range of variation of the characteristic parameter with respect to a given number of previous samples; and evaluating whether the value of the parameter falls within the range of variation of one of the messages and identifying as malicious the node that transmits the message.

14 Claims, 10 Drawing Sheets

(56)  References Cited

U.S. PATENT DOCUMENTS

| 2018/0248766 | A1* | 8/2018 | Ezra | .................... | H04L 63/1416 |
| 2019/0245872 | A1* | 8/2019 | Shin | .................... | H04L 63/1425 |
| 2020/0044842 | A1* | 2/2020 | Usui | .................... | H04L 9/0822 |
| 2020/0128031 | A1* | 4/2020 | Juliato | ................ | H04L 63/1416 |
| 2020/0351276 | A1 | 11/2020 | Bathurst et al. | | |
| 2021/0203682 | A1* | 7/2021 | Bajpai | ................. | H04L 63/0435 |
| 2022/0122018 | A1* | 4/2022 | Shibuya | ............... | G06Q 10/105 |

* cited by examiner

METHOD FOR PROTECTION FROM CYBER ATTACKS TO A VEHICLE, AND CORRESPONDING DEVICE

CROSS-REFERENCE TO RELATED APPLICATIONS

The present application claims priority to and all the benefits of Italian Patent Application No. 102021000013748, filed on May 26, 2021, which is hereby expressly incorporated herein by reference in its entirety.

BACKGROUND OF THE INVENTION

1. Field of the Invention

The present invention relates to techniques for protection from cyber attacks in a communication network, in particular a CAN (Controller Area Network), of a vehicle, that comprises a bus, in particular a CAN-bus, and a plurality of nodes associated with the bus in a signal-exchange relationship and associated at least in part to control units for controlling functions of the vehicle.

2. Description of the Related Art

The CAN-bus, adopted as communication bus in motor vehicles, is a communication means of a serial and multi-master type, in which each master, also referred to as node, connected to the bus is able to send, receive, and solve the conflicts of simultaneous access in transmission by a number of nodes.

Schematically illustrated in FIG. 1 is a CAN-bus 10, comprising a plurality of nodes 11. Indicated in FIG. 1 are three nodes 11$_1$, . . . , 11$_3$. A node 11, which is able to communicate on a CAN-bus 10, in general comprises, as shown in FIG. 1:

a CAN transceiver 12, which is associated, through a transmission line TT and a reception line TR, to the CAN-bus 10 and is configured for managing the electrical levels proper to the CAN-bus (physical layer of the OSI model);

a CAN controller 13, which is connected, through a transmission line CT and a reception line CR, to the CAN transceiver 12, and is configured for managing the logic levels and the serialization of the CAN-bus 10 (data-link layer of the OSI model);

a microcontroller 14, which contains the logic of transmission and reception of the messages (management of the OSI layers higher than the data-link layer).

The bus 10 comprises two lines. Denoted by 10H is the high line of the CAN-bus 10, or CAN-high, while denoted by 10L is the low line, or CAN-low. At the two ends of the bus 10 the two lines 10H and 10L are terminated by termination resistances 10R. In FIG. 1, the transmission lines TT are coupled to the high line 10H, whereas reception lines TR are coupled to the low line 10L.

Hence, the CAN-bus 10 is a differential bus and therefore has a structure with two lines, referred to as "CAN-high" 10H and "CAN-low" 10L.

The methods of identification of malicious messages in a CAN-bus that connects a plurality of nodes, for example electronic control units (ECUs), attempt to determine what message is malicious, but above all from what node or ECU it comes, so as to be able to track the source itself of the attack and take the necessary measures. The intrusion-detection systems currently implemented on vehicles manage to determine the presence of a cyber attack, but are not equipped with an attacker-recognition system.

Provided in Table 1 is the structure of a message according to the CAN protocol; in particular, the message of a data type is structured with sections S of contiguous bits, as listed below.

TABLE 1

| Section S [size in bits] | Content of section S |
|---|---|
| S1 SOF [1 bit] | start of CAN message |
| S2 Arbitration Field [12/32 bits] | contains message identifier |
| S3 Control Field [6 bits] | contains the information of the length of the data transmitted |
| S4 Data Field [0-64 bits] | data section (information content of the message) |
| S5 CRC Field [16 bits] | integrity-check code (with delimiter field) |
| S6 ACK Field [2 bits] | to confirm proper reception by the other nodes (with delimiter field) |
| S7 EoF [7 bits] | area of recessive bits necessary for signalling end-of-message |
| S8 ITM [3 bits] | intermission area, i.e., area of recessive bits that functions as separator between messages |

The CAN protocol is a multi-master protocol. This means that each network node can write on the bus whenever it is free. If a number of nodes wish to communicate at the same moment, the message with the highest priority wins and writes.

The fields of interest of the message are mainly the arbitration field S1 and the ACK (Acknowledge) field S6. The arbitration field is constituted by the message ID (Identifier), which determines the priority thereof and identifies the message. The smaller the binary value, the higher the priority. The ACK bit, which is originally recessive (and hence at 1), is overwritten with a dominant bit by the ECUs or nodes 11 that correctly receive the message. In this way, each node acknowledges the integrity of the message.

The conflicts are solved with a bit-by-bit arbitration of the ID field. The CAN specifies two logic states: "dominant" and "recessive", where dominant is the logic 0 and recessive the logic 1. If one ECU transmits a dominant bit and another one transmits a recessive bit, then there is a collision and the one that has transmitted the dominant bit wins. At this point, the other node loses arbitration and queues up for retransmission. In this way, the messages with high priority do not wait to be transmitted, and the messages with low priority attempt to write again on the bus after sending of the dominant message. This is what renders the CAN suitable as priority real-time communication system.

Illustrated in FIG. 2A is a diagram that shows the physical voltage levels VL on the CAN-bus 10 as a function of time t.

As illustrated in FIG. 1, each node 11 comprises a microcontroller 14 with a CAN controller 13, responsible for correct writing and reading of the messages on the bus 10 shared between the ECUs or nodes 11. It carries out bit stuffing, a procedure that consists in insertion of a bit having an opposite value after five consecutive bits of the same value, and of the checksum, and, after sending a message, waits for acknowledgement from the receivers. The CAN transceiver 12 converts the data stream from the voltage levels of the CAN-bus 10 to the levels that the CAN controller 13 uses, and vice versa.

The CAN-bus 10 is a differential bus, and therefore has a structure with two lines, as illustrated in FIG. 1, CAN-high 10H and CAN-low 10L. When a 0 bit is to be sent, the CAN transceivers 12 produce a voltage level of approximately 3.5 V on the CAN-high line 10H and 1.5 V on the CAN-low line 10L so that the potential difference $V_D$ between the two lines will be approximately 2 V. This 0 bit is referred to as "dominant". Likewise, when a 1 bit is to be transmitted, the output of the transceivers 12 is approximately 2.5 V both on the CAN-high line 10H and on the CAN-low line 10L, thus producing a potential difference $V_D$ of 0 V. The corresponding bit, in this case, is referred to as "recessive".

FIG. 2B illustrates schematically, by way of example, a transceiver 12, which comprises a MOS transistor 12H that operates as switch between the supply voltage VCC and the CAN-high line 10H and a MOS transistor 12L that operates as switch between the CAN-low line 10L and ground GND. To do this, the CAN transceivers 12 must switch on/switch off simultaneously the transistors 10H, 10L of which they are made up. When a dominant bit is transmitted, the MOS transistors 12H, 12L are switched on; when a recessive bit is transmitted, they are switched off and set in a high-impedance state.

Described hereinafter are some typical scenarios of attack.

One type of attack is referred to as "fabrication attack". Through an in-vehicle ECU compromised in such a way as to be a strong attacker, the adversary fabricates and injects messages with forged ID (Identifier), DLC (Data-Length Code), and data. The objective of this attack is to override any periodic messages sent by legitimate safety-critical ECUs, so that their receiver ECUs get distracted or become inoperable. For instance, the attacker injects various malicious messages with a given ID, for example 0xB0, which is usually sent by a legitimate ECU, at a high frequency. Thus, other nodes that normally receive the message 0xB0 are forced to receive the fabricated attack messages more frequently than the legitimate ones. In such a case, the attacker ECU is carrying out a fabrication attack on the message 0xB0 and on its original transmitter, the legitimate ECU.

Another type of attack is referred to as "suspension attack". To carry out a suspension attack, the attacker needs just one weakly compromised ECU. As in the case of Denial-of-Service (DoS) attacks, the objective of this attack is to stop/suspend transmission by the weakly compromised ECU, thus preventing delivery/propagation of information that is acquired by other ECUs on the CAN, the reason for this being that some ECUs must receive specific information from other ECUs for their proper operation. Consequently, the suspension attack can damage not only the weakly compromised ECU, but also other receiver ECUs.

Another type of attack is referred to as "masquerade attack". To mount a masquerade attack, the attacker needs to compromise two ECUs, one as a strong attacker and the other as a weak attacker. The objective of this attack is to manipulate an ECU while masking the condition of the ECU being compromised. Up to a given masquerade instant, the adversary monitors and learns which messages are sent and at what frequency by its weaker attacker; for example, the weak attacker sends the message 0xB0 every 20 ms. Since most network messages are periodic and broadcast, for example, over CAN, it is easy to learn their identifiers (IDs) and the transmission intervals. Once the adversary has learned the ID and the frequency of a message, at the masquerade instant the adversary stops transmission of its weak attacker and utilizes its strong attacker to fabricate and inject attack messages with ID=0xB0. Stopping transmission of the weak attacker and exploiting the strong attacker for transmission of malicious messages has the purpose of overcoming the inability of the weak attacker to inject messages. After the masquerade instant, the original transmitter of 0xB0, i.e., the weak attacker, does not send that message, whereas the strong attacker sends it, instead, at its original frequency. So, when the traffic of the bus, for example, the CAN bus, is observed, the frequency of the message 0xB0 remains the same, whereas its transmitter has changed.

From the above examples, it is evident how important it is to manage to discriminate from which ECU the attack really comes, especially in the case of a masquerade attack.

The patent WO2018/013171A1 describes a technique of fingerprinting of the ECUs in relation to the use of an IDS (Intrusion-Detection System) present in the architecture to manage to determine the presence of an attack.

SUMMARY OF THE INVENTION

The object of the present invention is to provide a monitoring method that will make it possible to recognize autonomously the presence of an attack and identifying from which node a malicious message is coming.

According to the present invention, the above object is achieved thanks to a protection method, as well as to a corresponding protection device, that present the characteristics referred to specifically in the ensuing claims. Thus, in one embodiment, the present invention is directed toward a method for protection from cyber attacks in a communication network of a vehicle, that includes a communication bus having a high bus line, on which high logic voltages pass, and a low bus line, on which low logic voltages pass; and a plurality of nodes associated with the communication bus in a signal-exchange relationship and associated at least in part to control units for controlling functions of the vehicle. The nodes exchange messages passing between nodes of the plurality of nodes to identify illicit messages. The messages are coded in data frames through dominant and recessive bits. The method includes the steps of acquiring dominant voltage measurements and obtaining an electrical characteristic of nodes that transmit messages. The method also includes the step of executing a malicious-node detection procedure that includes extracting at least one characteristic parameter of the voltage profile for each group; comparing the at least one characteristic parameter of a current group with a corresponding characteristic parameter extracted from a previous group; and if the comparison operation indicates that the at least one characteristic parameter of the current group differs from the at least one characteristic parameter of the previous group by at least one given difference value, supplying an identifier of the corresponding message and calculating a time of settling of the at least one characteristic parameter on a constant value. The method also includes the steps of a transmitting-node identification procedure, which includes comparing the at least one characteristic parameter evaluated at the settling time against all the corresponding characteristic parameters of all the messages received up to the settling time. The identification procedure includes defining, for each of the messages received, a range of variation of the at least one characteristic parameter with respect to a given number of previous samples; and evaluating whether the value of the at least one characteristic parameter falls within the range of variation of one of the messages and, if so, identifying as malicious node the node that transmits said message.

The present invention is also directed toward a corresponding protection device that employs the method summarized above.

Other objects, features and advantages of the present invention will be readily appreciated as the same becomes better understood after reading the subsequent description taken in connection with the accompanying drawings.

BRIEF DESCRIPTION OF THE DRAWINGS

The invention will be described with reference to the annexed drawings, which are provided purely by way of non-limiting example and in which.

DETAILED DESCRIPTION OF THE INVENTION

According to the solution described herein, each electronic control unit (ECU) or node is characterized by its hardware and constructional peculiarities, or inconsistencies, present at a physical level (voltage signals), considering that two ECUs produced by one and the same manufacturer, using the same components, are never identical in terms of measurements of the voltage levels VL present on the high bus line and the low bus line.

Figure 3:
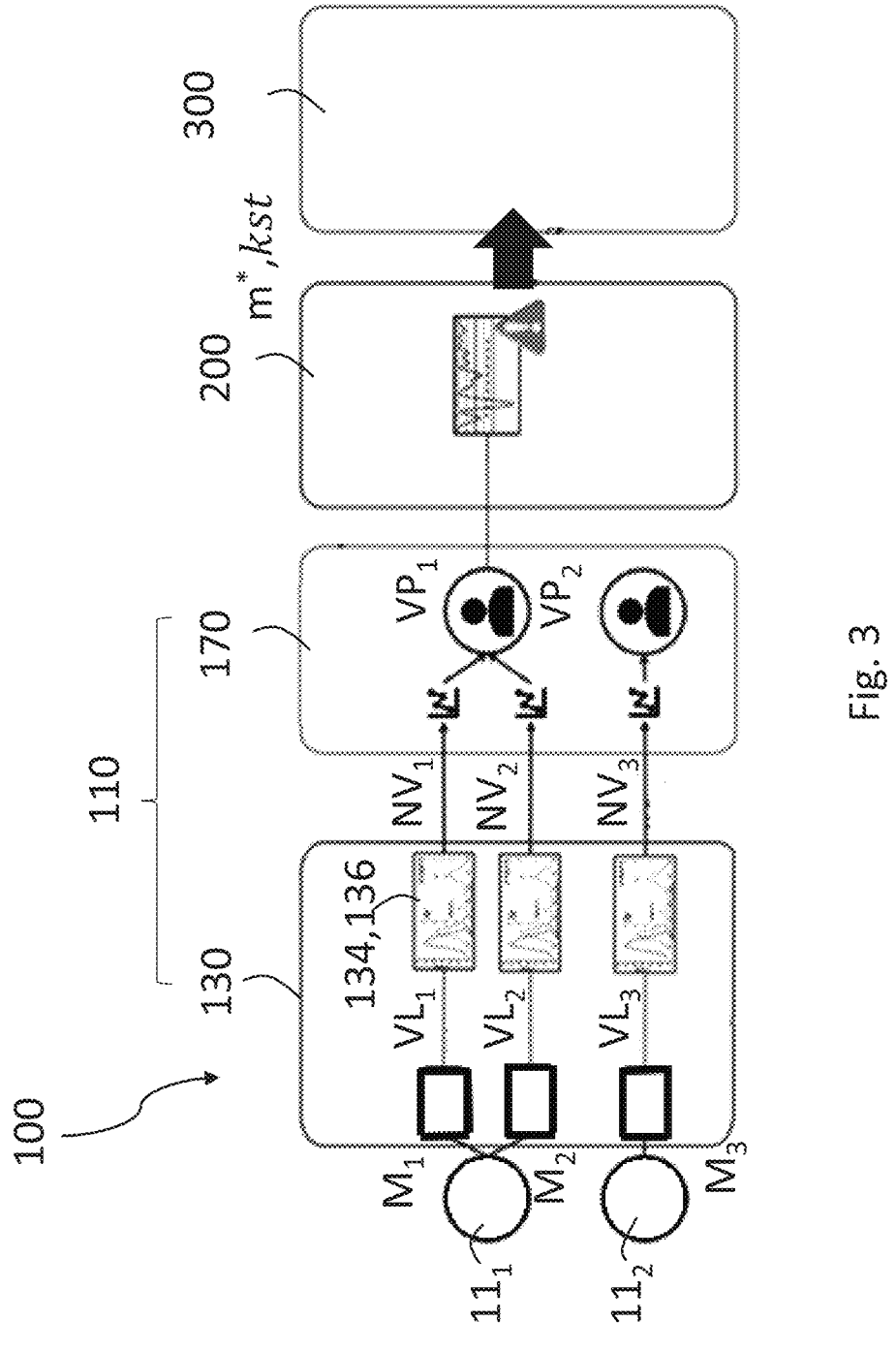
FIG. 3 illustrates a general diagram of the method described herein.

Represented schematically in FIG. 3 is the method for protection from cyber attacks in a vehicle communication CAN (Controller Area Network) that comprises a CAN-bus and a plurality of nodes or ECUs associated to said CAN-bus.

The above method, designated as a whole by the reference 100 comprises a first step 130 of building dominant measurements and a second step 170 of generating a voltage profile, which form part of a so-called fingerprinting procedure 110, i.e., a procedure for detecting the fingerprint of the ECU 11 that sends a message M. This fingerprinting procedure 110 obtains a unique fingerprint or signature for each ECU 11, exploiting voltage measurements read on the two lines of the CAN-bus 10, CAN-high 10H and CAN-low 10L, at the moment when the ECU 11 sends a message M.

In particular, in this regard, illustrated by way of example in FIG. 3 are a first ECU 111, which generates two messages $M_1$ and $M_2$, distinguished by respective message identifiers $ID_1$, and $ID_2$, and a second ECU 112 that generates a third message $M_3$, distinguished by the message identifier $ID_3$. Denoted by the subscript i is the generic i-th message $M_i$, which corresponds to the message identifier $ID_i$.

It is important that the above first two steps 130 and 170 manage to distinguish which voltage measurements read on the CAN-bus 10 effectively come from the ECU 11 that is sending the message M.

The method described is designed so as to be able to be easily integrated as a low-cost software application, which hence does not require any modification to the CAN, so that the rate of sampling of the voltage measurements is kept relatively low. This means that it is not known in which slot of the message the voltage values are measured, but only their values are known. Moreover, the method considers only the dominant measurements, because they are the ones effectively representative of the ECU 11 in so far as they regard switching-on of the MOSFET 12H, 12L of the respective transceiver 12.

Figures 4A, 4B, 4C:
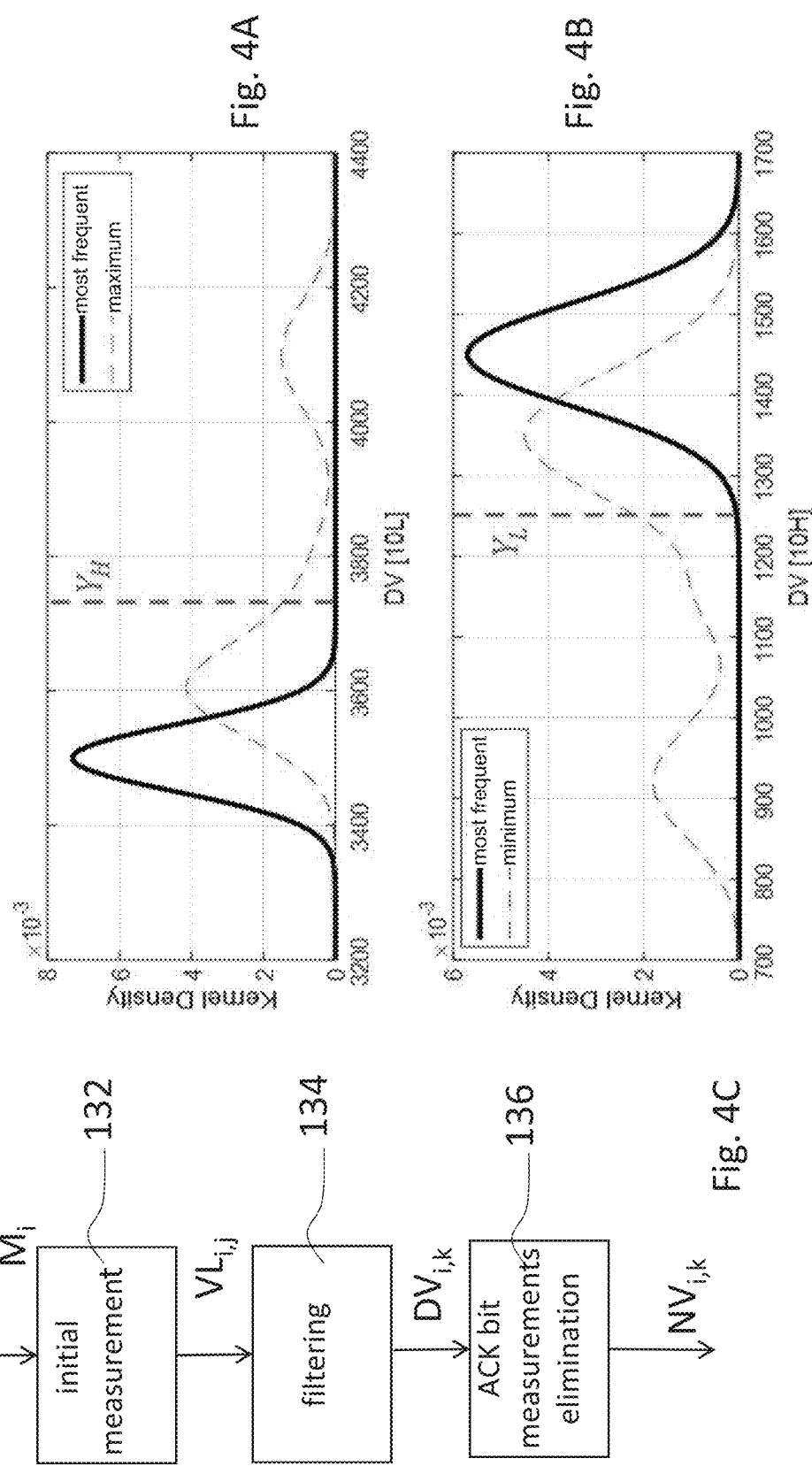
FIG. 4A and FIG. 4B show diagrams of quantities evaluated by the method described herein.
FIG. 4C shows a flowchart that represents a first step of operation of the method.

Hence, also with reference to the flowchart of FIG. 4C that details the operation 130, the voltages $VL_i$ on the high line CAN-high 10H and on the low line CAN-low 10L are initially measured 132 for a given message $M_i$. If i the index of the message, j may denote the index of the voltage measurements in the sequence of measurements, which are hence more specifically $VL_{i,j}$, where j is an integer that ranges from 1 to J.

It is then envisaged to carry out an operation of filtering 134 of the voltage measurements of the message $VL_i$ to obtain measurements $DV_i$ corresponding to just the dominant bits of the message.

In this context, all the measurements $VL_{ij}$ lower than 2.75 V on the high bus line CAN-high 10H and higher than 2.25 V on the low bus line CAN-low 10L are discarded in order to obtain a set of just dominant measurements $DV_{i,k}$, where k is an integer that ranges from 1 to K smaller than or equal to J, for a given message $M_i$. The operation of voltage measurement proceeds until the message $M_i$ is received completely and appears in the buffer of the transceiver 12, where, by reading the respective identifier $ID_i$ of the message $M_i$, it is possible to determine to which message the above dominant voltage measurements $DV_{i,k}$ belong.

Since, however, it may happen that a number of ECUs 11 communicate simultaneously, for example in the arbitration stage or during the ACK bit, it is useful to manage to discard the measurements that do not identify the legitimate ECU.

Hence, the filtering operation 134 may additionally comprise a procedure 136 of elimination of the measurements corresponding to the ACK bit. This is obtained by setting an upper threshold $\gamma_H$ above which the measurements on the bus line CAN-high 10H are discarded and a lower threshold $\gamma_L$ below which the measurements on the low bus line CAN-low 10L are discarded. These thresholds are characteristic of each ECU 11 and are created in the first step 130 of the method.

For instance, in order to define the above thresholds, given the distribution of the measurements values, specifically of the dominant voltage values $DV_{i,k}$, for the high bus line CAN-high 10H, the kernel density is calculated, and the upper discarding threshold $\gamma_H$ is set where the kernel density of the distribution of the most frequent values goes to zero, as represented in the diagram of FIG. 4A, which shows the kernel density of the dominant voltage values $DV_{i,k}$ for the most frequent values (solid line) and for the maximum values (dashed line) on the CAN-high 10H. For the CAN-low 10L, the kernel density is calculated, and the lower discarding threshold $\gamma_L$ is set where the kernel density of the distribution of the most frequent values goes to zero, as represented in the diagram of FIG. 4B, which shows the kernel density of the dominant voltage values $DV_{i,k}$ for the most frequent values (solid line) and for the minimum values (dashed line) on the CAN-low 10L.

For the acknowledgement bits ACK, which are rewritten after the message has been received with dominant bits, higher voltages, e.g., VH of approximately 4 V and VL of approximately 0.5 V, are measured so that they fall outside the discarding thresholds. The different voltage level for the ACK is due to the fact that during the ACK slot all the nodes except for the transmitting one carry out acknowledgement, transmitting a dominant bit and switching on their own MOSFETs in parallel. This leads to a reduction in the resistances between VCC-10H and 10L-GND, with consequent reduction of the corresponding voltage drop. Hence, the voltages measured during reception of ACK are respectively higher and lower than the ones corresponding to the non-ACK dominant bits, and can be discriminated using the procedure of definition of thresholds based upon the distribution of the most frequent values.

Hence, via the above operation only the following values are considered:

$$2.75V < DV < \gamma_H$$

where the dominant voltage values DV correspond to the CAN-high line 10H, and:

$$\gamma_L < DV < 2.25V$$

where the dominant voltage values DV correspond to the CAN-low line 10L.

In other words, in general, it is envisaged, in the operation 130, to measure the voltages on the bus lines and exclude the values associated to the recessive bits and to the acknowledgement bits ACK. These values correspond to non-ACK dominant voltage measurements $NV_{i,k}$ for the message $M_i$, where the index k ranges from 1 to NK, which is smaller than or equal to the integer K. Such an operation of elimination of the measurements corresponding to the ACK bit 136 hence comprises fixing for the high bus line and the low bus line respective lower and upper thresholds for the recessive bits, and respective upper and lower thresholds for eliminating the acknowledgement bits ACK.

It should be noted that the operations of block 130, which enable acquisition of the non-ACK dominant voltage measurements $NV_{i,k}$ for the message $M_i$, envisage in their implementation that the non-ACK dominant voltage measurements $NV_{i,k}$ for the message $M_i$ be stored temporarily in memory, it being possible, however, to say which message identifier $ID_i$ is available as information that can be used by the node only when the message $M_i$ has been received completely.

It should moreover be noted that the method 100, and hence the operation 130, may in some embodiments be started once a voltage measurement VL on the high bus line, CAN-high 10H, exceeds a respective threshold after a given period where the bus is free because this case is representative of sending of a 0-bit on the bus by an ECU (ISO 11898-2). This threshold is, for example, 2.75 V. Consequently, with reference also to what has been detailed previously, sampling of the voltage values VL can be performed without stopping, discarding from the sampled values the recessive ones, whereas the non-ACK dominant voltage measurements $NV_{i,k}$ are temporarily stored in memory. Usually, at this point, it is not possible to say to which i-th message identifier $ID_i$ they refer because this information is made available as information that can be used by the node only when the message $M_i$ has been received completely. This applies even though in effect the voltage values that define the i-th message identifier $ID_i$ are the first to be transmitted on the bus 10.

Then, in the step of generation of a voltage profile 170, the non-ACK dominant voltage measurements $NV_{i,k}$ are stored for each message identifier $ID_i$ so as to be sufficient in number to represent effectively the behaviour of the ECU 11 and used for obtaining features in terms of probabilistic distributions of the voltages, thus characterizing the physical behaviour of the ECU 11, both the instantaneous behaviour and the behaviour over time.

Figure 5:
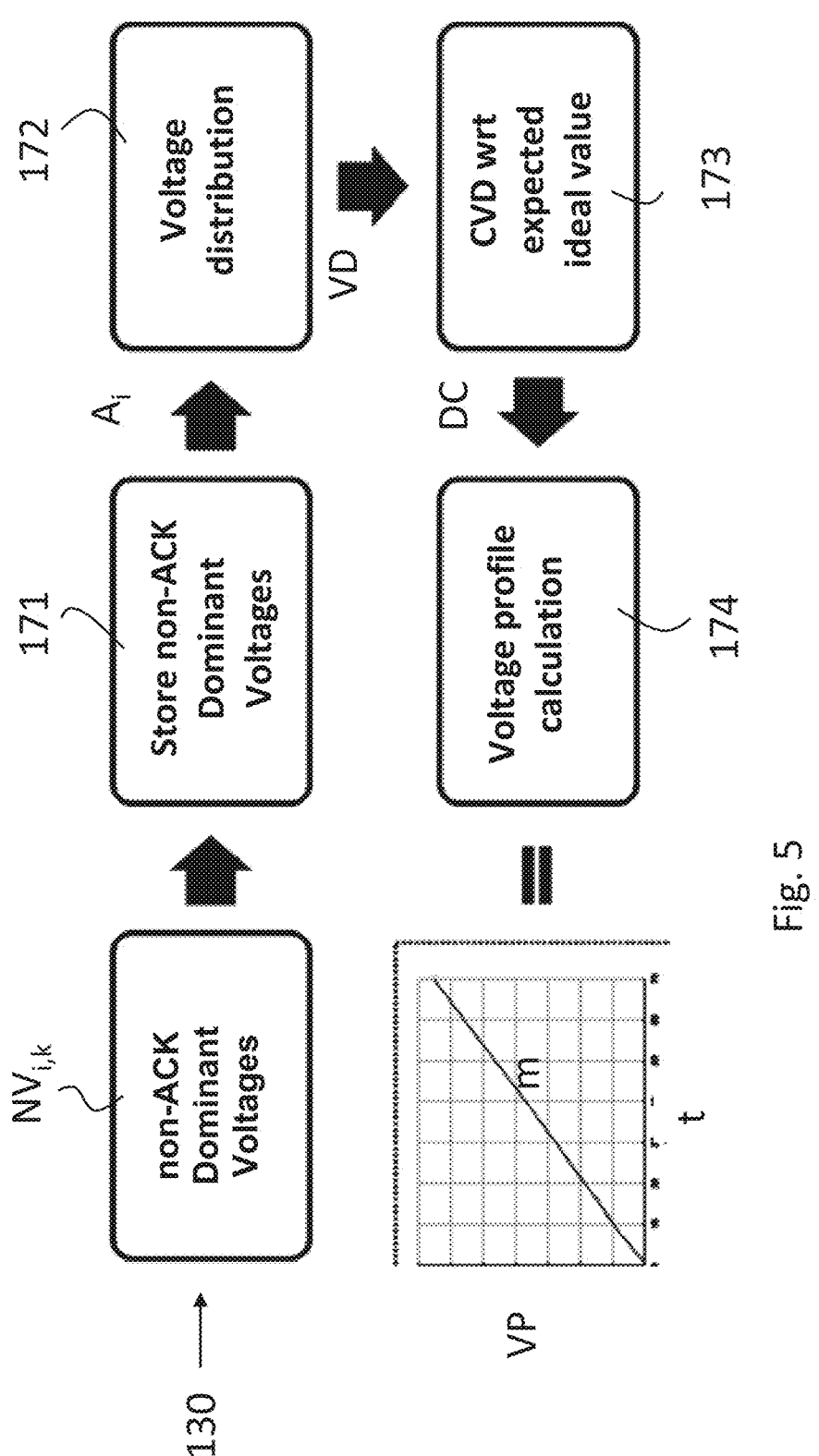
FIG. 5 shows a flowchart that represents a second step of operation of the method described herein.

In FIG. 5, which shows a flowchart that represents in greater detail the step of generation of a voltage profile 170, in a step 171 a given integer number of non-ACK dominant voltage measurements $NV_{i,k}$ acquired in a given number of successive instants for a given i-th message identifier $ID_i$ is stored in a corresponding set of stored measurements $A_i$.

In a step 172 a voltage distribution VD, in particular a percentile distribution, of the above set of stored measurements $A_i$ is calculated. Step 172 comprises calculating a distribution of the non-ACK dominant voltage values $NV_{i,k}$ in the set of stored measurements $A_i$, hence calculating some specific features of the aforesaid distribution, such as the most frequent value on the high line 10H, feature F1, and on the low line 10L, feature F2, as well as a certain number of percentiles, for example the 75th and 90th percentile on the high line 10H (F3, F4) and the 25th and 10th percentile on the low line 10L (F5, F6).

In a step 173, on the basis of the aforesaid voltage distribution VD, i.e., the most frequent values and percentiles for the high line and the low line, a sum of the cumulative voltage deviations DC is calculated.

In particular, in step 173, for the features selected from among the features F1, . . . , F6 obtained in step 172, the CVD (Cumulative Voltage Deviation) with respect to an expected ideal value is calculated. For instance, the CVD of the feature F1 at a given iteration, i.e., an execution of steps 171, 172 on a given group, corresponds to the CVD calculated at the previous iteration incremented by the product of the time elapsed from the previous iteration and 1 minus the ratio between the value of the feature F1 measured v(F1) and the expected value v*(F1), i.e., (1−v(F1))/v*(F1). Then, if v(F1) always differs by the same amount from the expected value v*(F1) at each iteration, i.e., in the group comprising the given number of measurements, the CVD increases linearly.

Hence, preferably, in step 173 the values of CVD of features taken from among the various features F1, . . . , F6 are added together.

Consequently, in steps 171 and 172, when the voltage measurements $NV_{i,k}$ are received, they are grouped together in groups of a given number of voltage measurements $NV_{i,k}$ that make up the set of measurements $A_i$. For each set of measurements $A_i$, there are, for example, calculated the mean or most frequent value for the low line 10L and the high line 10H and one or more percentiles for the voltage measurements in the group of voltage measurements $NV_{i,k}$. A cumulative deviation of the mean or most frequent value of the voltage measurements is then calculated, together with a cumulative deviation for each of the percentiles of the voltage measurements $NV_{i,k}$. A value of sum DC can then be obtained by adding the cumulative deviation of the mean of the voltage measurements $NV_{i,k}$ to the cumulative deviation of one or more percentiles of the voltage measurements $NV_{i,k}$.

It should be noted that, according to one aspect of the solution described, in some embodiments the set of measurements $A_i$ may comprise N groups of Z measurements obtained by using of a sliding window of samples. For each message identifier $ID_i$, as the samples, namely, voltage measurements $NV_{i,k}$, are stored, as soon as a new group is formed that comprises a number Z of measurements, the oldest group from among the N groups is discarded, whereas the group that has just been formed comes to form part of the set of data, i.e., the set of measurements $A_i$, to be processed. Hence, the characteristics of the sliding window can be defined by setting the number of groups N that make it up and the number of measurements Z that make up a group. Consequently, by using the sliding window respective profiles DC are produced, which are added together in the operation 174. This renders the method adaptive, i.e., able to adapt to changes of operating conditions, which in general can derive from temperature or from influences on the voltage.

The values of sum DC for each group of measurements, or sliding window, used for an iteration of the steps 171, 172, 173, are stored. Hence, in general, with the subsequent iterations a number of values DC are stored, which increase following a substantially linear pattern, which can be described as:

$$\Psi[n]=\Gamma[n]t[n]+e[n]$$

where n is the index of the iteration, i.e., the calculation of a value of CVD in step 172, in particular the sum DC in step 173.

Consequently, on the basis of the values of $\Psi[n]$, in step 174 it is possible to calculate a voltage profile VP as a function of time. To obtain the voltage profile VP, in step 174, on the basis of the values DC available at a given instant, a fitting is carried as a function of time t, for example through the RLS (Recursive Least Square) algorithm.

Hence, via the procedure 170, the messages sent by one and the same ECU 11 are represented by a sheaf of straight lines that have substantially the same angular coefficient m, i.e., an angular coefficient that falls within a given interval or corresponds to a given value but for a tolerance, and the same constant value or y-intercept q, which represents the fingerprint or signature, referred to as total voltage profile VP.

In particular, the angular coefficient m is determined at each step with a technique of adaptive signal processing that also enables calculation of the identification error e[n] of the problem of identification of the linear parameters:

$$\Psi[n]=\Gamma[n]t[n]+e[n]$$

which can be rewritten as the straight-line equation:

$$y(x_k)=mx_k+q$$

where $x_k$ is the value of the temporal abscissa associated to the k-th sample measured $NV_{i,k}$, which may be the time of acquisition of the last sample of the set $A_i$.

More specifically, the straight line $y(x_k)$ is constructed on the values stored in this way: the last Z samples belonging to a group are taken and with these the stored value associated to the i-th message identifier $ID_i$ is updated, and to this new stored value there is associated, as time, the time at which the last of the Z samples $x_k$ has been obtained. A distribution is obtained, which, through a fitting, is approximated to a straight line, from which the slope m and the constant value q are extracted.

Thus $x_k$ is the abscissa value associated to formation of the last set or group of Z samples.

Figures 6A, 6B:
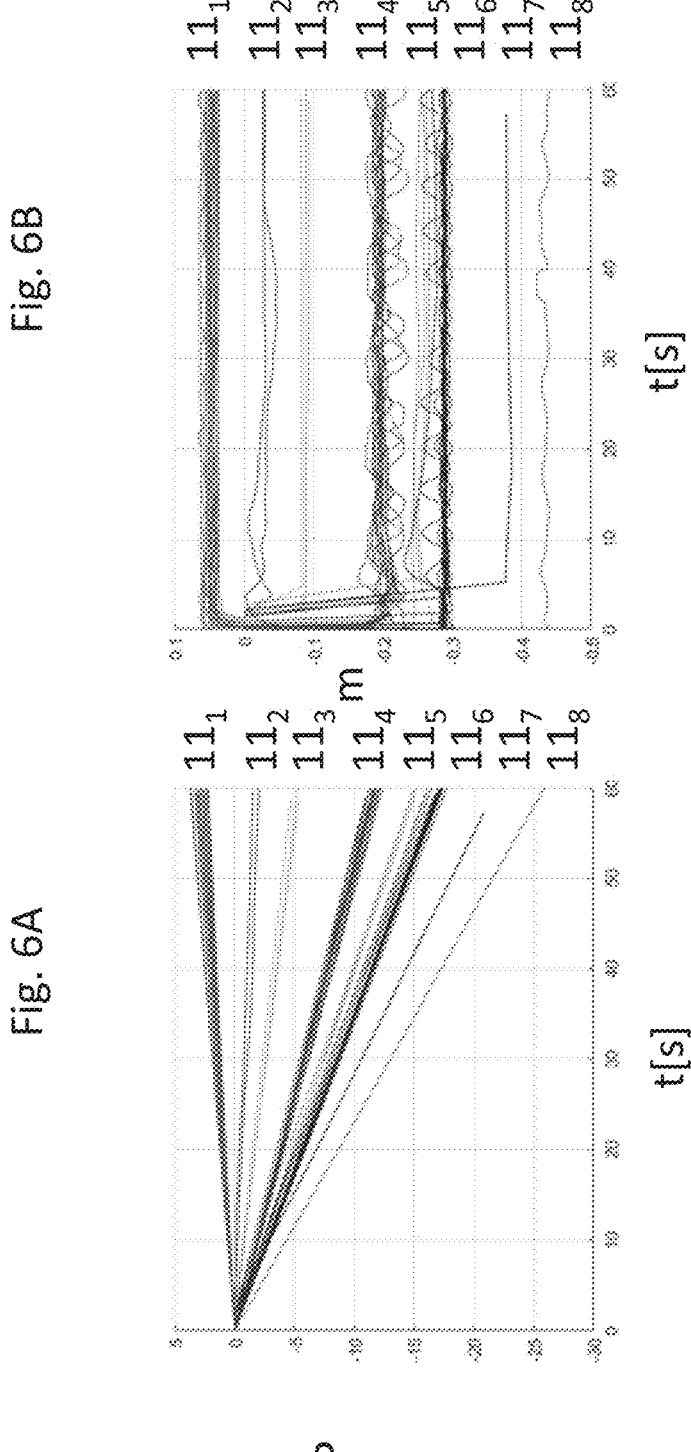
FIG. 6A and FIG. 6B are time plots that represent quantities obtained using the method described herein.

In this regard, illustrated, for example, in FIG. 6A is the construction of the straight lines, i.e., voltage profiles VP, for each message identifier ID. For each message $M_i$ received from eight ECUs, $11_1, \ldots, 11_8$, the straight line of the value of the cumulated voltage deviation as a function of time t is represented. As may be seen, the angular coefficients of the straight lines of each sheaf corresponding to the ECUs $11_1, \ldots, 11_8$ lie in distinct intervals, which in general do not have values in common. In FIG. 6B, once again represented as a function of time t is, instead, the plot of the angular coefficient m. The data of FIGS. 6A-6B regard an acquisition of a duration of sixty seconds carried out on a motor vehicle for a subnetwork of eight ECUs and a traffic of seventy different message identifiers ID.

As has been said, according to an important aspect of the solution described herein, the fingerprint VP of the ECU is updated in time via the use of a sliding window of samples, which comprises a given number of samples or non-ACK dominant voltage measurements NV, but discards at each instant t the older measurements, introducing the most recent non-ACK dominant voltage measurements $NV_{i,k}$. This renders the method adaptive, i.e., able to adapt to changes of operating conditions, which in general can derive from the temperature or influences on the voltage.

The above updating at each measurement instant is exploited by the subsequent steps of detection 200 and identification 300 of the attacker. In particular, after the identification of the attacker, e.g., the malicious node, tracking thus the source itself of the attack, the necessary measures are taken. In particular such measures may include one or more of forensic, isolation, security patch.

Figure 7:
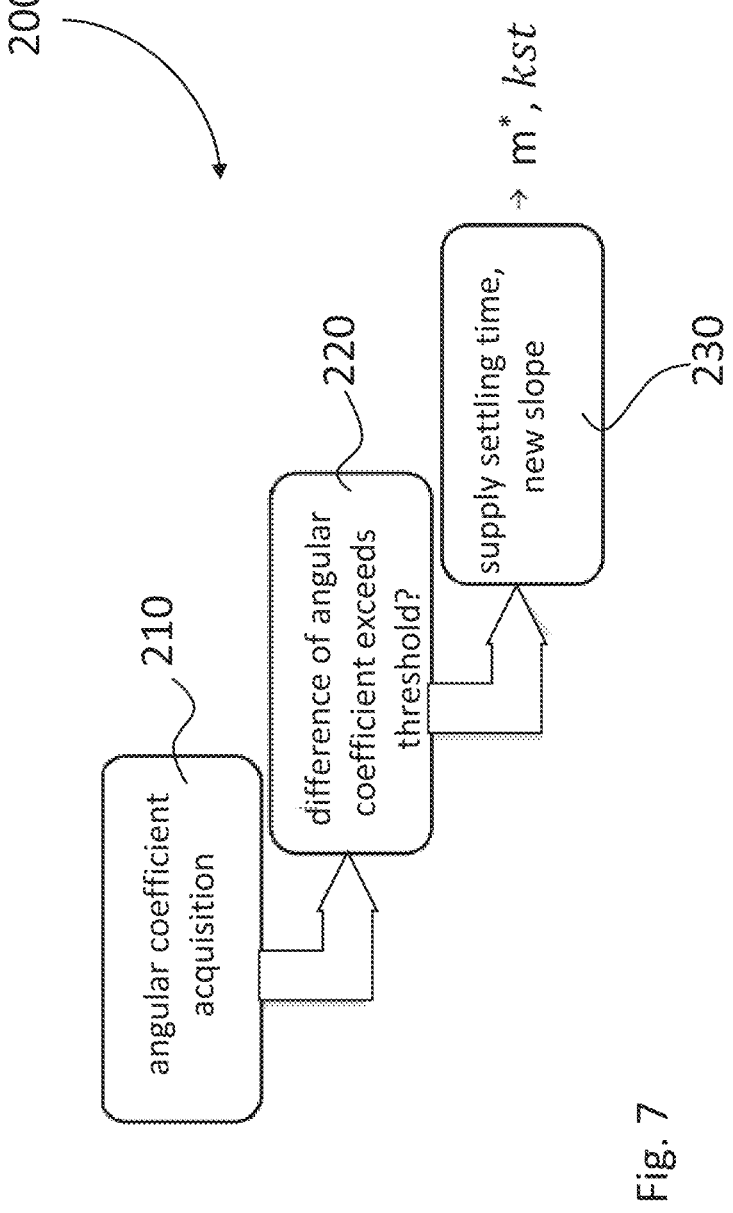
FIG. 7 shows a flowchart that represents schematically a further step of the method described herein.

Illustrated in FIG. 7 is a block diagram that represents in detail the detection step 200.

In a step 210 for a given ECU 11 a value of angular coefficient m is acquired every Z measurements NV using the sliding window. Preferably, a number ni of initial measurements is excluded in order not to consider the initial transient during which the differences between the slopes of the straight lines are great, with the consequent risk of false positives.

In a step 220, it is evaluated whether the difference of the value of angular coefficient m acquired in step 210 with respect to the value acquired in the interval, in particular currently acquired, of Z measurements exceeds a fixed variation threshold ATH. In particular it is acquired 210 every Z measurements NV a value of angular coefficient m and computed the difference between the values of angular coefficient acquired every Z measurements NV, in particular between a preceding interval of Z measurements and the following interval of Z measurements. If, for a given number of consecutive intervals of Z measurements $NV_{i,k}$ the aforesaid variation threshold is exceeded, it is determined that there is an attack in progress. Step 220 returns a time when the attack occurred, i.e., the time when the condition of step 210 is met, and the corresponding message identifier ID, which hence corresponds to a compromised message.

Since, after start of the attack, associated to a change in the angular coefficient or slope m of the straight line, the voltage profile VP settles on the voltage profile of the compromised ECU 11 that is effectively sending the compromised message, in a step 230 it is envisaged to supply the aforesaid settling time $k_{st}$, calculated as the last instant at which the difference between two values of slope m calculated on consecutive intervals of Z measurements NV exceeds the variation threshold ATH. The settling time $k_{st}$ indicates the time at which the compromised ECU has been recognized, and in step 230 the new profile VP* reached is moreover supplied, i.e., the voltage profile VP of the compromised ECU 11, in particular its new slope m*.

It may be noted that in variant embodiments, instead of the slope m, the constant value q of the straight line may be used, i.e., the identification error e[n], which also itself varies considerably at the moment when there is an attack in progress. In that case, it may be necessary to vary the configurable parameters, for example the parameters limsup, liminf, Z described hereinafter.

Consequently, in general, the method described herein envisages, once the straight line representing the voltage profile is obtained, carrying out the detection step 200 and the following step 300 of identification of the ECU 11 as a function of one of the parameters of the straight line, either the slope m or the constant value (or y-intercept) q.

At the end of the detection step 200, it is hence possible to proceed to the step 300 of identification of the attacker ECU 11. The parameters of the new voltage profile VP* at the settling time $k_{st}$ are compared with those of all the other profiles of the message IDs calculated up to that moment, in particular all the other profiles $m_I$ corresponding to respective message identifiers ID calculated up to that moment, which in particular may correspond to the settling time $k_{st}$. From this analysis, there are preferably excluded the message identifiers ID that have a number of past voltage profiles VP lower than a given value, for example 2Z, so as not to consider those message identifiers ID that have not yet settled.

Figure 8:
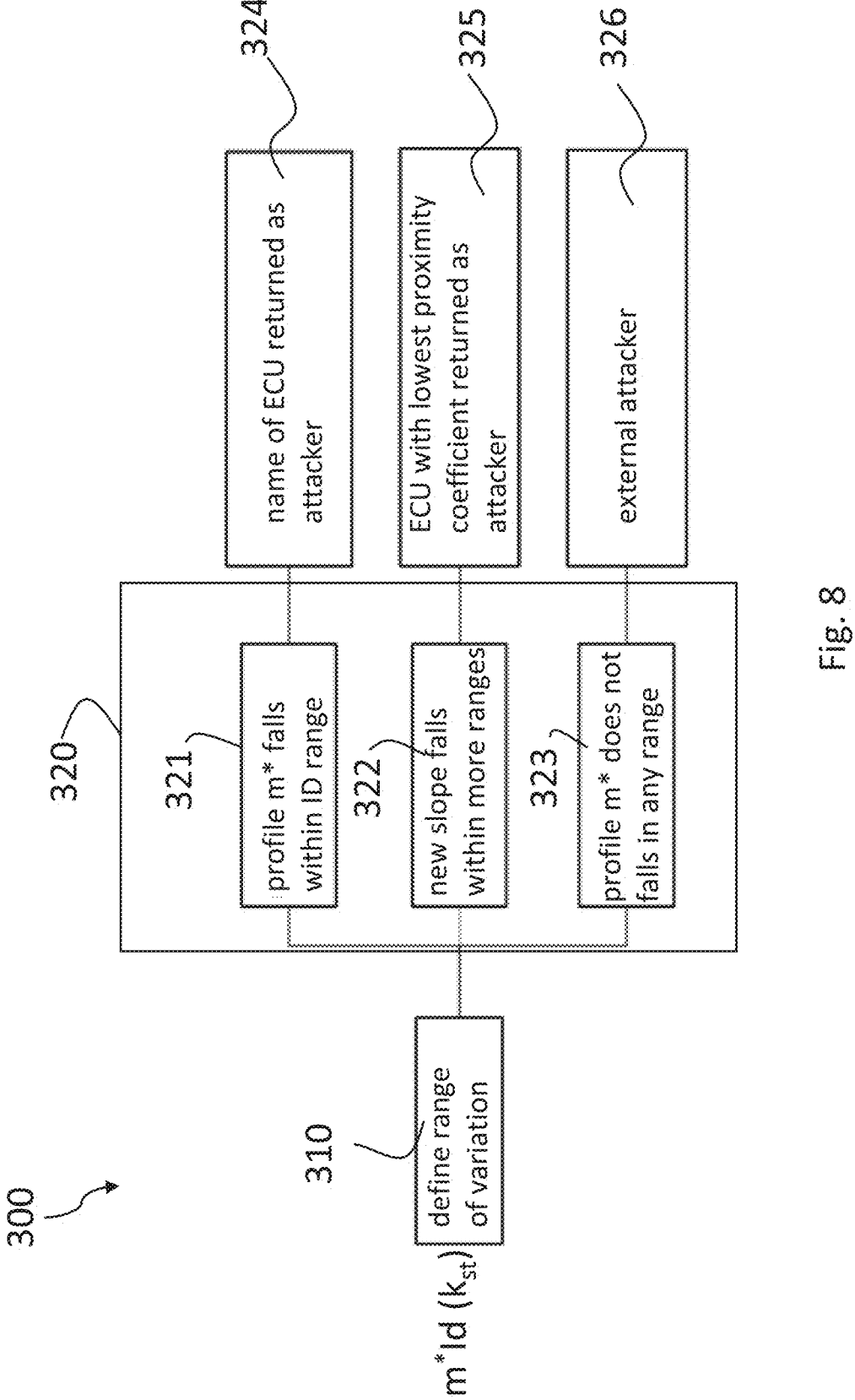
FIG. 8 shows a flowchart that represents schematically a final step of the method described herein.

For this purpose, as illustrated in FIG. 8, which represents schematically step 300, in the first place it is envisaged, in a step 310, to define, for each message identifier ID, a range of variation that has an upper limit limsup and a lower limit liminf:

$$limsup = m_i(k_{st}) + \sigma(m_i(k_{st} - k_{past}), \\ m_i(k_{st} - k_{past} + 1), \dots , m_i(k_{st}))$$

$$liminf = m_i(k_{st}) - \sigma(m_i(k_{st} - k_{past}), \\ m_i(k_{st} - k_{past} + 1), \dots , m_i(k_{st}))$$

where $m_i$ is the parameter, specifically, the slope of the voltage profile of the i-th message identifier ID considered, $k_{st}$ is the settling time (denoted by its index k, in particular corresponding to the index of voltage measurements $NV_{i,k}$, or samples), $k_{past}$ indicates the past samples of the slope, and σ is the standard deviation. Hence, the upper limit limsup corresponds in the example to the slope $m_i$ of the voltage profile of the i-th message identifier calculated at the settling time $k_{st}$, added to which is the standard deviation of the values of the same slope $m_i$ calculated on a number $k_{past}$ of samples that precede the settling time $k_{st}$. The lower limit liminf corresponds to the slope $m_i$ of the voltage profile of the i-th message identifier at the settling time $k_{st}$, subtracted from which is the standard deviation of the values of the same slope $m_i$ calculated on a number $k_{past}$ of samples that precede the settling time $k_{st}$.

For each i-th identifier $ID_i$, in the times and modes explained previously for steps 171-174, R+1 successive values of the i-th profile $m_i$ are calculated and gathered, i.e., $m_i(0), m_i(1), \dots , m_i(R), m_i(R+1)$. Every R values of the profile $m_i$ a check is made on the value of the difference of the profile $m_i$ with respect to the value of the profile R samples before. Namely, a check is made on the difference in absolute value between $m_i(R)$ and $m_i(0)$, and then on the difference between $m_i(2 \cdot R)$ and $m_i(R+1)$, i.e., on the next interval of length R of samples, and so forth. If this difference exceeds a threshold T for a number of consecutive checks, then the message identifier $ID_i$ in question is declared to be under attack.

Subsequently, the profile $m_i$ of that message identifier $ID_i$ is expected to settle, after the variation, at a new value, and hence the difference $|m_i(R \cdot i) - m_i(R \cdot (i-1))|$ is expected to return below the threshold T.

The settling time $k_{st}$ is determined as the instant corresponding to the last sample of profile $m_i$ that exceeds the threshold T before it returns below the threshold.

Once the settling time $k_{st}$ is known, which corresponds, for example, to the sample S*R, the standard deviation σ is calculated on the last R samples of profile $m_i$ before S*R, i.e., $m_i(S*R-R), m_i(S*R-R+1), \dots , m_i(S*R)$. Then, an interval around the profile value $m_i$ is determined, defined by $$liminf = m_i(S \cdot R) - \sigma$$

$$limsup = m_i(S \cdot R) + \sigma$$

Then, in a step 320, it is evaluated in what range associated to a respective message identifier ID the profile m* of the attacker determined in the detection step 200 falls.

If it is evaluated 321 that the profile of the attacker, hence in the example the slope m*, falls within a range associated to a message identifier ID, i.e., between the corresponding upper limit limsup and the corresponding lower limit liminf, in a subsequent step 324 the name of the corresponding ECU is returned as name of the attacker, in particular along with an associated proximity coefficient PC, in terms of how many times the value of standard deviation σ the slope m* of the attacker node is close to the one identified:

$$PC = |m^*(k_{st}) - m_i(k_{st})| / \sigma(m_i(k_{st} - k_{past}), \\ m_i(k_{st} - k_{past} + 1), \dots , m_i(k_{st}))$$

i.e., the proximity coefficient is equal to the difference, in absolute value, between the slope m* of the attacker node and the slope $m_i$ of the voltage profile of the i-th message identifier, calculated at the settling time $k_{st}$, divided by the standard deviation of the values of the same slope $m_i$ calculated on a number $k_{past}$ of samples that precede the settling time $k_{st}$.

Since it may happen that the profile m* of the attacker obtained in step 230 falls in more than one range, in this case in a step 322 all the names of the ECUs identified are stored with the corresponding proximity coefficient PC, and a warning signal is displayed. In a subsequent step 325, the ECU whose name is associated to the lowest proximity coefficient PC is selected as attacker ECU.

If, in a step 323, it is evaluated that the profile m* does not fall within any range, in a step 326 the attacker is identified as "external" attacker; i.e., the attacker ECU is external to the network of the vehicle.

Hence, the method proposed continues to update the profile of each message identifier ID, via the sliding window, even though the identifier is compromised. In this way, if the corresponding message is sent by another (attacked) ECU, there may be noted a change in the voltage profile, and this variation of profile determines the instant of start of the attack.

Figures 9A, 9B:
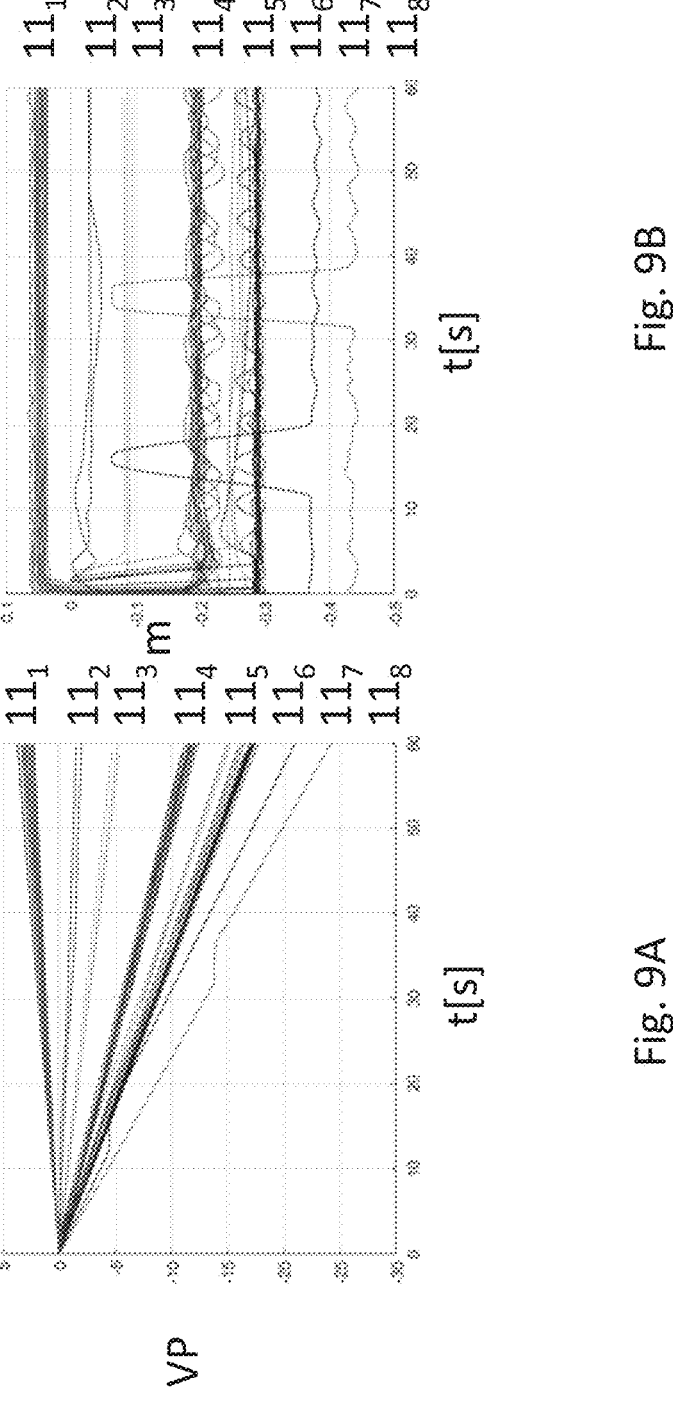
FIG. 9A and FIG. 9B are time plots that represent quantities evaluated by said final step of the method described herein.

The above behaviour is clearly visible in FIGS. 9A and 9B, which show diagrams similar to those of FIG. 6A and 6B, in the case of a masquerade attack via a device external to the network that for five seconds sends the identifiers ID of the ECUs 11₇ and 11₈ at two different times. It may be noted how in FIG. 6A the straight lines change their own slope m a lot at the start of the attack for the aforesaid two ECUs, and then settle at a characteristic value of the attacked ECU. It is at this precise instant, i.e., at settling time $k_{st}$, that the algorithm proceeds to identification of the ECU. Next, once the attack terminates and the legitimate ECU returns to communicating normally, the profile returns to its characteristic value.

In FIG. 9B, which shows the slope m, it may be noted how the slopes m of the two ECUs $11_7$ and $11_8$ at the moment when the attack occurs go to one and the same value precisely because the attacker device is the same for both ECUs.

The method described may be installed in a standard ECU so as to be easily integrated in the vehicle network without modifying it.

Figure 10:
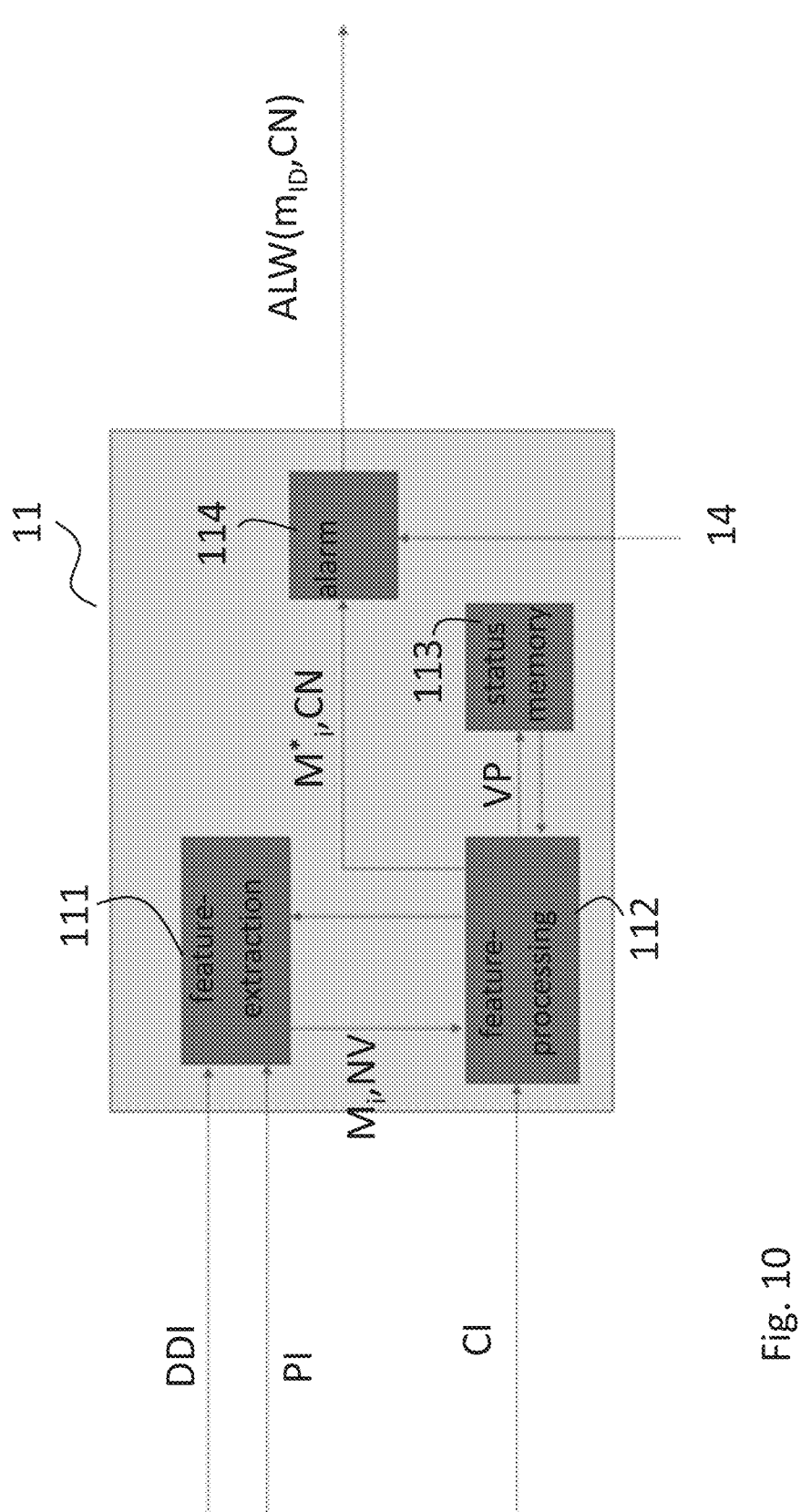
FIG. 10 is a schematic representation of a circuit arrangement for implementing the method described herein.

FIG. 10 is a schematic representation of a possible implementation architecture.

Figure 1:
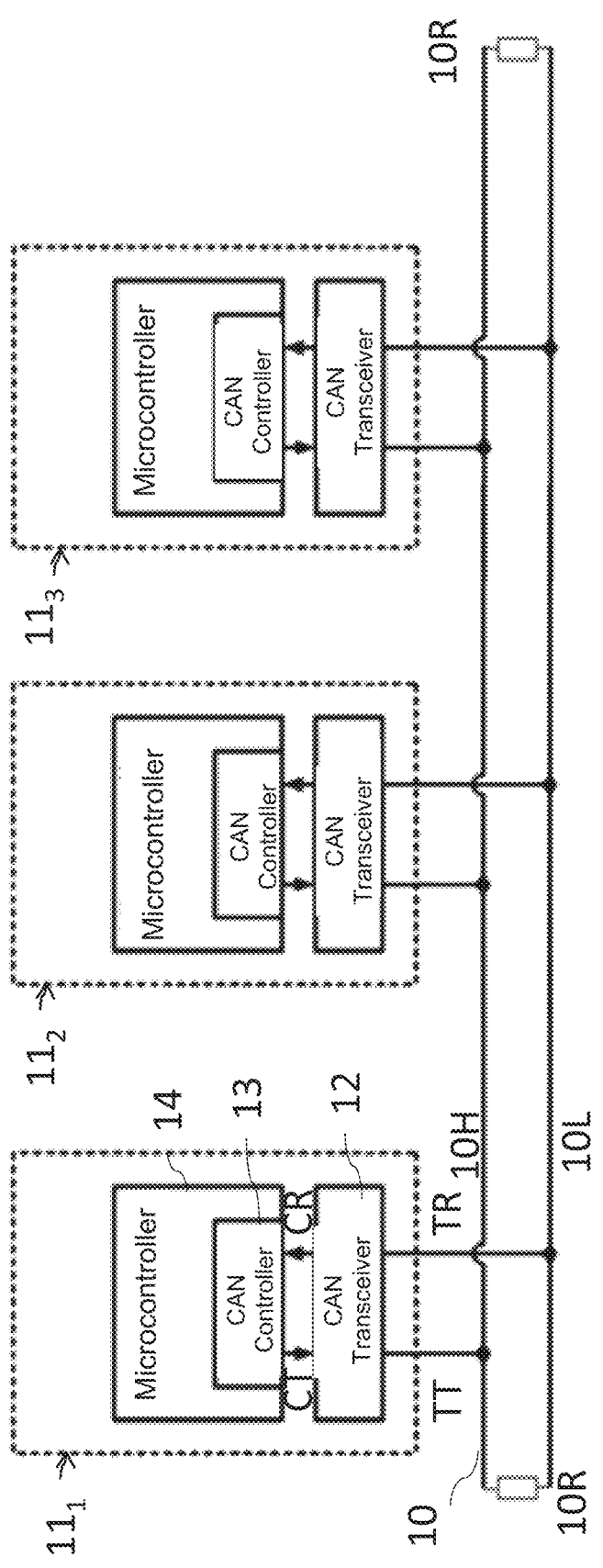
FIGS. 1, 2A, and 2B have already been described previously.
Figures 2A, 2B:
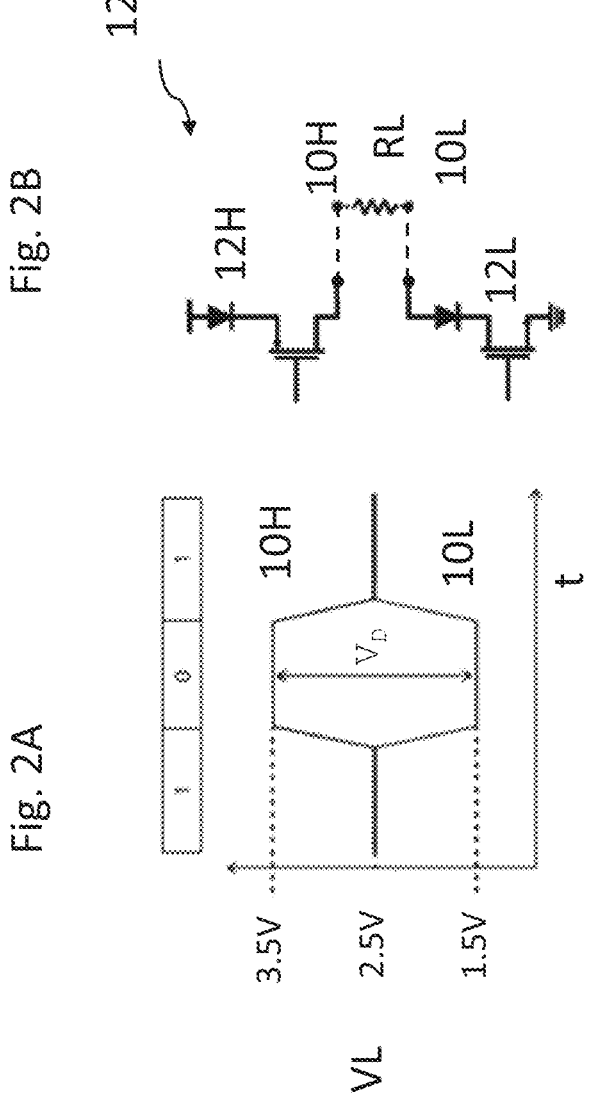

The ECU or node 11 comprises, in addition to the blocks illustrated in FIG. 1, a feature-extraction block 111, which receives at input both the digital data via a digital data interface DDI and the physical levels VL from the CAN-bus 10, via a physical interface PI, and is configured for calculating the features necessary for the subsequent processing operations, i.e., the non-dominant measurements.

The ECU 11 further comprises a feature-processing block 112, configured for setting some parameters for the block 111, for example the discarding thresholds of the procedure 130, and for calculating the voltage profiles, also identifying the malicious message and corresponding ECU. Also provided is a configuration interface CI for receiving configuration information. Basically, the block 112 is configured for executing the procedure 170, 200, 300, supplying at output the identifier of the malicious message $M^*_i$ and the name of the malicious node CN.

Then, an alarm block 114 is envisaged, which may be a simple switch, for example implementing an AND logic function, performed by the control interface of the ECU 11 and activated [by the feature-processing block 112, and is configured to produce a warning alarm ALW, comprising the identifier of the malicious message and the name CN of the ECU from which it comes, preferably, also in addition to the times such as the settling time $k_{st}$.

The blocks 111 and 112 comprise respective RAMs for saving all the measurements necessary for them.

Hence, in general, described herein is a node 11 or ECU comprising:

a feature-extraction block 111, configured to acquire 130 the dominant voltage measurements $NV_{i,k}$; and a feature-processing block 112, configured to obtain 170 an electrical characteristic VP, in particular a voltage profile VP, of nodes that transmit messages M and to execute said malicious-node detection procedure 200 and said malicious-node identification procedure 300, in particular such obtaining 170 an electrical characteristic VP of nodes that transmit messages M being obtained via the steps of:

acquiring 171 consecutive groups of voltage measurements VL on the high bus line 10H and on the low bus line 10L during reception of messages (M) at receiving nodes and calculating a distribution thereof;

calculating 172 values of distribution statistics;

calculating 173 a cumulative voltage deviation for each value of statistic; and obtaining a voltage profile VP by adding the cumulative voltage deviations of each statistic the node 11 further comprising an alarm block 114, performed by the control interface of the ECU 11, for example the microcontroller 14, and activated by the feature-processing block 112, configured to produce a warning alarm ALW that comprises the identifier of the malicious message and the name CN of the node 11 from which it comes, and, preferably, also the times such as the settling time $k_{st}$.

Furthermore, the ECU comprises a status memory 113, configured to store at each step the status of the system, i.e., the voltage profiles. This status memory 113 is updated by the feature-processing block 112 (where the features are the voltage profiles) that stores therein the new updated voltage profile and can download therefrom the voltage profile stored therein.

Moreover present (not shown in FIG. 10) is a nonvolatile memory, stored in which is a map of the identifiers ID and the corresponding voltage profiles calculated the last time that the vehicle was turned on (key-on) so that these values can be considered as starting point for the next key on. This is because the method carries out real-time updating so as not to have obsolete profiles that would jeopardize the outcome of identification of the attacker. The model considered is always the most recent one.

Thus, the protection method from cyber attacks here described substantially corresponds to a procedure of monitoring the messages exchanged among the network nodes carrying out an anomaly-detection operation, e.g. 200, and carrying out a transmitting-node identification operation, e.g. 300. Tracking the source of malicious messages is indeed a protection procedure in itself as the above anomaly detection and malicious node recognition operations have outputs which may already interpreted as alarms or alert in themselves. Also, the protection method may include specific alarm, as using block 114. Also, other form of measures against the attacks can be used, corresponding to the identified attack, as mentioned such measures may include one or more of forensic, isolation, security patch operations.

Hence, from what has been described above, the advantages of the solution proposed emerge clearly.

The solution here presented, renders the technique of ECU fingerprinting capable of recognizing autonomously the presence of an attack and identifying from which ECU the malicious message is coming simply by exploiting the continuous updating of the voltage profile and its variation that is visible during an attack. Hence, as compared to the prior art of WO2018013171A1 the solution proposed enables independent implementations of external IDS s (Intrusion-Detection Systems) and consequently is more easily implementable on embedded automotive systems.

Unlike other techniques that envisage the use of an underlying IDS that detects the presence of an attack and then identifies the ECU attacked, or else classifies it on the basis of machine-learning techniques, the algorithm presented here manages to do both of these things in a simple way and at low cost in computational terms and with a continuous and constantly updated monitoring of the voltage profiles. It likewise manages to return also the times at which the attack has been detected (times corresponding to starting of the algorithm, and hence upon turning on the vehicle and at which the attacker ECU has been identified, this being information that is useful for evaluating the performance and reliability of the system.

The attack-detection technique, based upon continuous updating of the voltage profile, enables determination of the presence of an attack without a further IDS (Intrusion-Detection System), thus guaranteeing autonomy for the fingerprinting procedure. It moreover returns the corresponding time (corresponding to starting of the method, and hence to turning on the vehicle at the start of the attack, in addition to the identifier of the malicious message.

The attacker-identification technique is able to determine in a short time from which ECU the attack comes by exploiting the knowledge of the unique fingerprinting of each ECU of the CAN. Thanks to a dedicated logic, it manages to distinguish cases in which the attacked ECU is external or internal to the network, supplying in each case a proximity measurement indicative of the confidence with which it is established that that particular ECU has been attacked.

The technique proposed (combination of attack detection and attacker identification) does not require the knowledge of the field of the message to which the voltage values measured belong.

The technique proposed (combination of attack detection and attacker identification) does not require modifications of the network or of the protocol used in the system in which it is included.

The technique proposed (combination of attack detection and attacker identification) can operate with CAN messages in standard or extended format and at any communication rate of the CAN.

The technique proposed (combination of attack detection and attacker identification) may be applied also to protocols other than the CAN protocol.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for protection from cyber attacks in a communication network of a vehicle having a communication bus including a high bus line, on which high logic voltages pass, and a low bus line, on which low logic voltages pass;

a plurality of nodes associated with the communication bus in a signal-exchange relationship and associated at least in part to control units for controlling functions of the vehicle, where the nodes exchange messages passing between nodes of the plurality of nodes, and the messages are coded in data frames through dominant and recessive bits, said method including the steps of:

acquiring dominant voltage measurements; and obtaining an electrical characteristic corresponding to a voltage profile (VP) of nodes that transmit messages, by acquiring consecutive groups (k) of voltage measurements (VL) of dominant voltage measurements $(NV_{i,k})$ on the high bus line (10H) and on the low bus line (10L) during reception of messages (M) at receiving nodes and calculating a distribution thereof;

calculating values of distribution statistics;

calculating a cumulative voltage deviation for each value of statistic; and obtaining a voltage profile (VP) representing a straight line by adding the cumulative voltage deviations of each statistic;

executing a malicious-node detection procedure that comprises:

extracting at least one characteristic parameter of said voltage profile for each group, said characteristic parameter being the slope (m) of the straight line representing the voltage profile or a constant value (q) of the straight line representing the voltage profile;

comparing, over said consecutive groups (k) of voltage measurements (VL), said at least one characteristic parameter of a current group of voltage measurements with a corresponding characteristic parameter extracted from a previous group of voltage measurements; and if said comparison operation indicates that said at least one characteristic parameter of the current group differs from the at least one characteristic parameter of the previous group by at least one given difference value, supplying an identifier of the corresponding message and calculating a settling time $(k_{st})$ which is a time of settling of the at least one characteristic parameter on a constant value over said consecutive groups (k) of voltage measurements (VL), executing a transmitting-node identification procedure, which includes:

comparing said at least one characteristic parameter evaluated at the settling time against all the corresponding characteristic parameters of all the messages received up to said settling time $(K_{st})$, said identification procedure comprising:

defining, for each of said messages received, a range of variation of said at least one characteristic parameter with respect to a given number of previous samples, previous with respect to the settling time $(K_{st})$; and evaluating whether the value of said at least one characteristic parameter falls within the range of variation of one of said messages and, if so, identifying as malicious node the node that transmits said message, and after determining the malicious node, taking necessary measures including at least applying a security patch to the malicious node.

2. The method as set forth in claim 1, wherein supplying said identifier and computing the settling time if said at least one characteristic parameter of the current group differs from the at least one characteristic parameter of the previous group for a given number of executions of the comparison operation.

3. The method as set forth in claim 1, further including the step of calculating a proximity coefficient of the at least one characteristic parameter with respect to each of the at least one characteristic parameter of said messages, and if the value of the at least one characteristic parameter falls within the range of variation of more than one of said messages, identifying as malicious node the node that transmits said message to which the lowest value of proximity coefficient is associated.

4. The method as set forth in claim 1, further including the step of identifying as malicious node an external node if the value of the at least one characteristic parameter of the message under analysis does not fall within the range of variation of any of said messages.

5. The method as set forth in claim 1, wherein the extremes of said range of variation (limsup, liminf) correspond to the value of the characteristic parameter of each of said messages received evaluated at the settling time added to or subtracted from which is a value of standard deviation of the values of the same parameter calculated on a number $(k_{past})$ of samples prior to the settling time.

6. The method as set forth in claim 5, wherein said proximity coefficient is calculated as the difference between the characteristic parameter of the node identified as malicious and the characteristic parameter of the respective message divided by said standard deviation.

7. The method as set forth in claim 1, wherein said characteristic parameter is a slope of the straight line representing the voltage profile.

8. The method as set forth in claim 1, wherein said characteristic parameter is a constant value of the straight line representing the voltage profile.

9. The method as set forth in claim 1, wherein said consecutive groups are formed via a sliding window of voltage measurements in which one or more older voltage measurements are replaced with corresponding new voltage measurements.

10. The method as set forth in claim 1, further including the steps of: acquiring dominant voltage measurements via the steps of measuring voltages on the high line and on the low line for a given message; and filtering said voltage measurements to obtain measurements corresponding to just the dominant bits of the message by carrying out elimination of the voltage measurements corresponding to message acknowledgement bits, by setting for the high bus line and the low bus line lower and upper thresholds, respectively, for the recessive bits, and upper and lower thresholds, respectively, for eliminating the acknowledgement bits to obtain non-ACK dominant voltage measurements for the message.

11. A device for protection from cyber attacks in a communication network of a vehicle, that comprises: a communication bus on which high logic voltages pass, and a low bus line, on which low logic voltages pass; and a plurality of nodes associated to said communication bus in a signal-exchange relationship and associated at least in part to control units for controlling functions of the vehicle, said nodes exchanging messages passing between nodes of said plurality of nodes to identify illicit messages, said messages being coded in data frames through dominant and recessive bits, said device configured for operating as set forth in the method of claim 1.

12. The protection device as set forth in claim 11, further including a node that comprises: a feature-extraction block, configured to acquire dominant voltage measurements; a feature-processing block, configured to obtain an electrical characteristic of nodes that transmit messages (M) and to execute said malicious-node detection procedure and said malicious-node identification procedure; and an alarm block, which is performed by the control interface of the control unit and activated by the feature- processing block, and is configured to produce a warning alarm comprising the identifier of the malicious message and the name of the node from which it comes, and, preferably, also the times, such as the settling time.

13. The protection device as set forth in claim 12, wherein said node comprises a status memory, configured to store the voltage profiles, which is updated by the feature-processing block, which stores therein a new, updated, voltage profile and can download therefrom a voltage profile stored therein.

14. The protection device as set forth in claim 11, wherein the control unit comprises a nonvolatile memory, stored in which is a map of the message identifiers and the corresponding voltage profiles calculated the last time that the vehicle was turned on (key-on).

* * * * *